(12) United States Patent
Joy (10) Patent No.: US 8,457,441 B2
(45) Date of Patent: Jun. 4, 2013

(54) FAST APPROXIMATE SPATIAL REPRESENTATIONS FOR INFORMAL RETRIEVAL

(75) Inventor: Joseph M. Joy, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 1028 days.

(21) Appl. No.: 12/145,607

(22) Filed: Jun. 25, 2008

(65) Prior Publication Data

US 2009/0324132 A1  Dec. 31, 2009

(51) Int. Cl.
 *G06K 9/36* (2006.01)
(52) U.S. Cl.
 USPC ............ 382/284; 382/240; 707/100; 707/102
(58) Field of Classification Search
 USPC .................. 382/240, 284; 707/100, 103, 102, 707/13, 715, 718, 736, 755; 706/45
 See application file for complete search history.

(56) References Cited

U.S. PATENT DOCUMENTS

| | | | |
|---|---|---|---|
| 1,261,167 A | | 4/1918 | Russell |
| 5,710,916 A | * | 1/1998 | Barbara et al. ..................... 1/1 |
| 5,718,906 A | * | 2/1998 | Martin et al. ................. 424/401 |
| 5,758,314 A | | 5/1998 | McKenna |
| 5,781,906 A | * | 7/1998 | Aggarwal et al. ..................... 1/1 |
| 5,802,361 A | | 9/1998 | Wang et al. |
| 5,875,446 A | | 2/1999 | Brown et al. |
| 6,101,496 A | | 8/2000 | Esposito |
| 6,167,369 A | | 12/2000 | Schulze |
| 6,321,189 B1 | | 11/2001 | Masuichi et al. |
| 6,349,276 B1 | | 2/2002 | McCarley |
| 6,381,598 B1 | | 4/2002 | Williamowski et al. |
| 6,629,097 B1 | | 9/2003 | Keith |
| 6,732,120 B1 | | 5/2004 | Du |
| 6,868,410 B2 | * | 3/2005 | Fortin et al. ..................... 706/45 |
| 6,904,560 B1 | | 6/2005 | Panda et al. |
| 7,007,013 B2 | | 2/2006 | Davis et al. |
| 7,117,199 B2 | | 10/2006 | Frank et al. |
| 7,146,358 B1 | | 12/2006 | Gravano et al. |
| 7,158,878 B2 | | 1/2007 | Rasmussen et al. |
| 7,174,290 B2 | | 2/2007 | Loofbourrow et al. |
| 7,246,109 B1 | | 7/2007 | Ramaswamy |

(Continued)

FOREIGN PATENT DOCUMENTS

| | | |
|---|---|---|
| WO | 2005096178 A1 | 10/2005 |
| WO | 2007133625 A2 | 11/2007 |

OTHER PUBLICATIONS

Jacox et al., "Spatial Join Techniques", ACM Transaction on Database Systems vol. V, published on Nov. 2003, pp. 1-45, and appendix p. App-1 to App-23.*

(Continued)

*Primary Examiner* — Mekonen Bekele
(74) *Attorney, Agent, or Firm* — Lyon & Harr, LLP; Katrina A. Lyon (57) ABSTRACT

A spatial region, such as a geographic region, may be represented by a series of vectors in a binary tree or other binary representation. The binary tree may be generated by successively dividing a region into smaller rectangles or vectors, until either a vector is completely within the region or reaches a size limit. The vectors may be ordered, allowing a linear comparison between two binary trees to determine if one space overlaps the other. Because the comparison between two ordered binary trees results in an ordered binary tree, subsequent comparisons may also be performed linearly.

18 Claims, 9 Drawing Sheets

U.S. PATENT DOCUMENTS

| | | | |
|---|---|---|---|
| 7,257,570 | B2 | 8/2007 | Riise et al. |
| 7,293,028 | B2* | 11/2007 | Cha et al. ............................... 1/1 |
| 7,471,839 | B2* | 12/2008 | Moreira ........................ 382/240 |
| 7,634,496 | B1* | 12/2009 | Evans .................................... 1/1 |
| 7,668,817 | B2 | 2/2010 | Enomoto et al. |
| 7,917,480 | B2 | 3/2011 | Dean et al. |
| 2002/0193986 | A1 | 12/2002 | Schirris |
| 2003/0033328 | A1* | 2/2003 | Cha et al. ...................... 707/204 |
| 2004/0024756 | A1 | 2/2004 | Rickard |
| 2005/0065916 | A1 | 3/2005 | Ge et al. |
| 2005/0108213 | A1 | 5/2005 | Riise et al. |
| 2005/0119875 | A1 | 6/2005 | Shaefer et al. |
| 2005/0216253 | A1 | 9/2005 | Brockett |
| 2006/0089927 | A1 | 4/2006 | Bandyopadhyay et al. |
| 2006/0089928 | A1 | 4/2006 | Johnson |
| 2006/0197763 | A1 | 9/2006 | Harrison et al. |
| 2006/0218114 | A1 | 9/2006 | Weare et al. |
| 2006/0242129 | A1 | 10/2006 | Libes et al. |
| 2007/0043723 | A1 | 2/2007 | Bitan et al. |
| 2007/0088690 | A1 | 4/2007 | Wiggen et al. |
| 2007/0094006 | A1 | 4/2007 | Todhunter et al. |
| 2007/0143318 | A1 | 6/2007 | Hendrey et al. |
| 2007/0150199 | A1 | 6/2007 | Riise et al. |
| 2007/0198505 | A1 | 8/2007 | Fuller |
| 2007/0233649 | A1* | 10/2007 | Wang et al. ........................ 707/3 |
| 2007/0276845 | A1 | 11/2007 | Geilich |
| 2008/0010259 | A1 | 1/2008 | Feng et al. |
| 2008/0065670 | A1* | 3/2008 | Cha et al. ...................... 707/101 |
| 2008/0270111 | A1 | 10/2008 | Hanumanthappa |
| 2008/0319990 | A1 | 12/2008 | Taranenko et al. |
| 2009/0037403 | A1 | 2/2009 | Joy et al. |

OTHER PUBLICATIONS

Zwol, et al., "Spatially-Aware Information Retrieval on the Internet", Jul. 1, 2003, 15 pages.

Guoray Cai, "GeoVSM: An Integrated Retrieval Model for Geographical Information", M.J. Egenhofer and D.M. Mark (Eds.), GIScience, 2002, LNCS 2478, pp. 65-79.

Oyvind Vestavik, "Geographic Information Retrieval: An Overview", 2003, 7 pages.

Schlieder, et al., "Qualitative Spatial Representation for Information Retrieval by Gazetteers", in Proceedings of Conference of Spatial Information Theory COSIT, vol. 2205, Morrow Bay, CA, 2001, pp. 336-351.

Bakshi, et al., "Exploiting Online Sources to Accurately Geocode Addresses", Proceedings of the 12th annual ACM international workshop on Geographic information systems, Washington, DC, USA, Nov. 12-13, 2004, pp. 194-203.

Cayo, et al., "Positional error in automated geocoding of residential addresses", International Journal of Health Geographics 2003, pp. 1-12.

Chaudhuri, et al., "Robust and Efficient Fuzzy Match for Online Data Cleaning", Proceedings of the 2003 ACM SIGMOD International Conference on Management of Data, San Diego, California, 2003, pp. 313-324.

Chen, et al., "Efficient Query Processing in Geographic Web Search Engines", Proceedings of the 2006 ACM SIGMOD International Conference on Management of Data, Chicago, Illinois, USA, Jun. 27-29, 2006, pp. 277-288.

Christen, et al., "A Probabilistic Geocoding System based on a National Address File", Proceedings of the 3rd Australasian Data Mining Conference, 2004, Cairns, 13 pages.

Irene Gargantini, "An Effective Way to Represent Quadtrees", Communications of the ACM, vol. 25, Issue 12, Dec. 1982, pp. 905-910.

Goldberg, et al., "From Text to Geographic Coordinates: The Current State of Geocoding", Urban and Regional Information Systems Association Journal, vol. 19, No. 1, 2007, pp. 33-46.

Jacox, et al., "Spatial Join Techniques", ACM Transactions on Database Systems, vol. V, No. N, Nov. 2006, 68 pages.

Marco Kimler, "Geo-Coding: Recognition of Geographical References in Unstructured Text, and Their Visualisation", Diploma Thesis at the University of Applied Sciences Hof, Department of Computer Science and Technology, Technical Computer Science, Ispra, Aug. 23, 2004, 85 pages.

Krieger, et al., "On the Wrong Side of the Tracts? Evaluating the Accuracy of Geocoding in Public Health Research", American Journal of Public Health, vol. 91, No. 7, Jul. 2001, pp. 1114-1116.

Kristjansson, et al., "Interactive Information Extraction with Constrained Conditional Random Fields", in AAAI, 2004, pp. 412-418.

Jochen L. Leidner, "Toponym Resolution in Text: "Which Sheffield is it?"", Proceedings of the 27th Annual International ACM SIGIR Conference on Research and Development in Information Retrieval, Sheffield, United Kingdom, 2004, pp. 602-602.

Greta Nicoara, "Exploring the Geocoding Process: A Municipal Case Study using Crime Data", Summer 2005, 29 pages.

Pouliquen, et al., "Geographical Information Recognition and Visualisation in Texts Written in Various Languages", Proceedings of the 2004 ACM symposium on Applied computing, Nicosia, Cyprus, 2004, pp. 1051-1058.

Jerry H. Ratcliffe, "On the accuracy of TIGER-type geocoded address data in relation to cadastral and census areal units", International Journal of Geographical Information Science, vol. 15, No. 5, 2001, pp. 473-485.

"Trillium Software System", http://www.trilliumsoftware.com/home/products/index.aspx.

Viola, et al., "Learning to Extract Information from Semi-structured Text using a Discriminative Context Free Grammar", Proceedings of the 28th annual international ACM SIGIR conference on Research and development in information retrieval, Salvador, Brazil, 2005, pp. 330-337.

Zhou, et al., "Hybrid Index Structures for Location-based Web Search", Proceedings of the 14th ACM international conference on Information and knowledge management, Bremen, Germany, 2005, pp. 155-162.

Al-Onaizan, Y., K. Knight, Machine transliteration of names in Arabic text, Proc. of ACL Workshop on Computational Approaches to Semitic Languages, Jul. 2002, pp. 1-13.

Aslan, I., F. Xu, H. Uszkoreit, A. Krüger, J. Steffen, COMPASS2008: Multimodal, multilingual and crosslingual interaction for mobile tourist guide applications, Proc. of the First Int'l Conf. on Intelligent Technologies for Interactive Entertainment, INTETAIN 2005, Nov. 30-Dec. 2, 2005, pp. 3-12, Madonna di Campiglio, Italy.

Bakshi, R., C. A. Knoblock, S. Thakkar, Exploiting online sources to accurately geocode addresses, Proc. of the 12th ACM Int'l Workshop on Geographic Info. Sys's, ACM-GIS 2004, Nov. 12-13, 2004, pp. 194-203, Washington, DC, USA.

Clef Forum, p. 1, http://www.clef.campaign.org, Mar. 30, 2008.

Dictionary.com, Define textual at Dictionary.com, Mar. 5, 2010, http://dictionary.Reference/com/browse/lexical and http://dictionary.reference.com/browse/textual, pp. 2.

GeoCLEF, Oct. 2007, pp. 2, http://ir.shef.ac.uk.geoclef.

Jones, C. B., R. Purves, Workshop report, ACM Workshop on Geographical Information Retrieval, Jun. 2006, pp. 34-37, vol. 40, No. 1.

Jones, C. B., A. I. Abdelmoty, D. Finch, G. Fu, S. Vaid, The Spirit spatial search engine: Architecture, ontologies and spatial indexing, Proc. of the Third Int'l Conf. on Geographic Information Science, GIScience 2004, Oct. 20-23, 2004, pp. 125-139, Adelphi, MD, USA.

Josh!, T., J. Joy, T. Kellner, U. Khurana, A. Kumaran, V. S. Sengar, Crosslingual location search, Proc. of 2008, The 31st Annual Int'l ACM SIGIR Conf. on Research and Development in Info. Retrieval, SIGIR 2008, Jul. 20-24, pp. 211-218, Singapore.

Knight, K., J. Graehl, Machine transliteration, Proc. of the Conf. 35th Annual Meeting of the Association for Computational Linguistics and 8th Conf. of the European Chapter of the Association for Computational Linguistics, Jul. 7-12, 1997, pp. 128-135, Universidad Nacional de Educación a Distancia (UNED), Morgan Kaufmann Publishers/ACL, Madrid, Spain.

Martins, B., M. J. Silva, L. A. Ribeiro, Indexing and ranking in Geo-IR systems, Proc. of the 2005 Workshop on Geographic Info. Retrieval, GIR 2005, Nov. 4, 2005, pp. 31-34, Bremen, Germany.

Lin, D., MaxEnt Classifier, 2003, pp. 21.

Oh, J.-H., K.-S. Choi, H. !Sahara, A comparison of different machine transliteration models, J. Artif. Intel'. Res., Oct. 2006, pp. 119-151, vol. 27.

Sengar, V. S., T. Joshi, J. Joy, S. Prakash, K. Toyama, Robust location search from text queries, Proc. of the 15th ACM Int'l Symposium on Geographic Info. Sys's, ACM-GIS 2007, Nov. 7-9, 2007, pp. 1-8, Seattle, Washington, USA.

Watters, C. R., G. Amoudi, Geosearcher: Location-based ranking of search engine results, J. of the American Soc. for Info. Science and Tech., JASIST 2003, Jan. 15, 2003, pp. 140-151, vol. 54, No. 2.

Wisegeek, What is Cache Memory?, http://web.archive.org/web/20061107115341http://www.wisegeek.com/what-is-cache-memory.htm, Mar. 5, 2010, pp. 2.

Xu, F., K. Netter, H. Stenzhorn, A system for uniform and multilingual access to structured database and web information in a tourism domain, Proc. of the 38th Annual Meeting of the Assoc. for Computational Linguistics, Demo Session (ACL'00), Oct. 3-6, 2000, pp. 8, Hong Kong.

\* cited by examiner

FAST APPROXIMATE SPATIAL REPRESENTATIONS FOR INFORMAL RETRIEVAL

RELATED APPLICATION

This patent is related to the U.S. patent application Ser. No. 12/145,615 entitled, "CROSS LINGUAL LOCATION SEARCH," filed on the same day as this application.

BACKGROUND

Representation of geographic data is data-intensive. As a result, searching for geographic locations can be very time consuming. When ambiguous search information requires multiple searches for a single location query, the large amount of data to be processed can lead to such poor performance as to be impractical.

SUMMARY

A vector multi-key (VMK) is used to represent geographic regions, or any n-dimensional space, to allow fast searching and matching. First, a polygon representing a geometry (or cartographic region) is reduced to a series of vectors and compressed. Then the vectors are used to generate a spatial approximation of the geometry. A linear binary tree is generated to map the resulting geometry.

Comparing geometries for overlaps becomes a simple binary comparison, even over non-contiguous spatial regions. Because intersection results retain their order, successive intersection operations may be performed efficiently without intermediate processing or sorting. A large binary tree can be broken down into a hierarchy of smaller linear binary trees for more efficient intersection computation.

The binary tree representation may be stored in compressed in form in memory or on disk.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
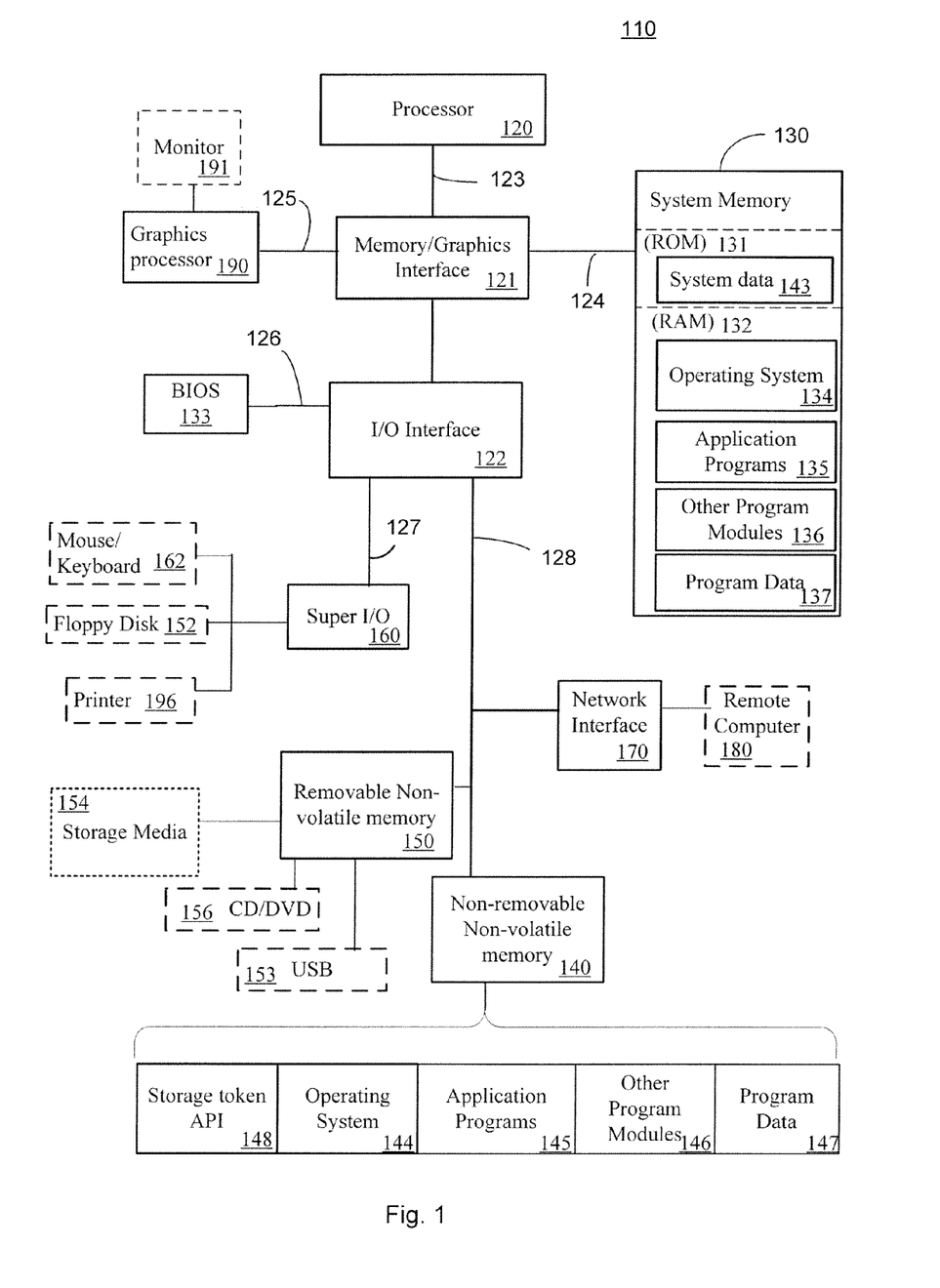
FIG. 1 is a block diagram of a general purpose computing device suitable for supporting fast spatial representations.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 2:
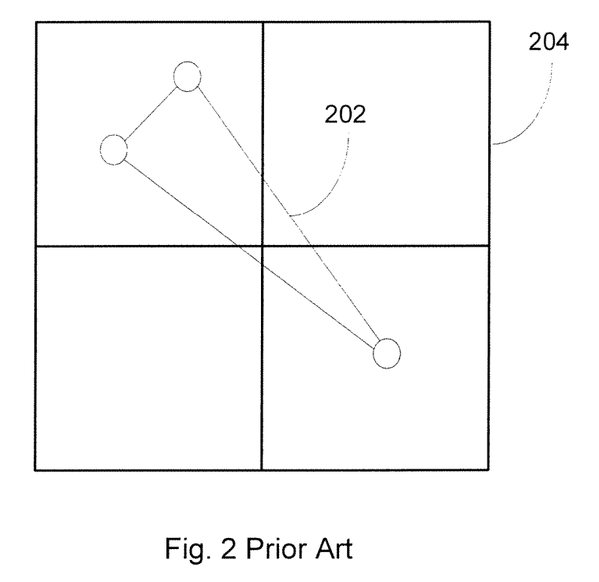
FIG. 2 is an illustration of a prior art spatial representation.

FIG. 2 illustrates a prior art spatial representation using a bounding box in a traditional vector multi-key extraction technique. A polygon 202 is bounded by a series of rectangles 204 and a vector multi-key is created for each rectangle. A vector multi-key is a series of binary vectors (e.g. magnitude and direction boundaries) that describe in some approximation the polygon 202. As can be seen, the polygons are uniform in size and either do not provide a very good match, or may be uniformly smaller and require many more vectors to describe the shape.

Figure 3:
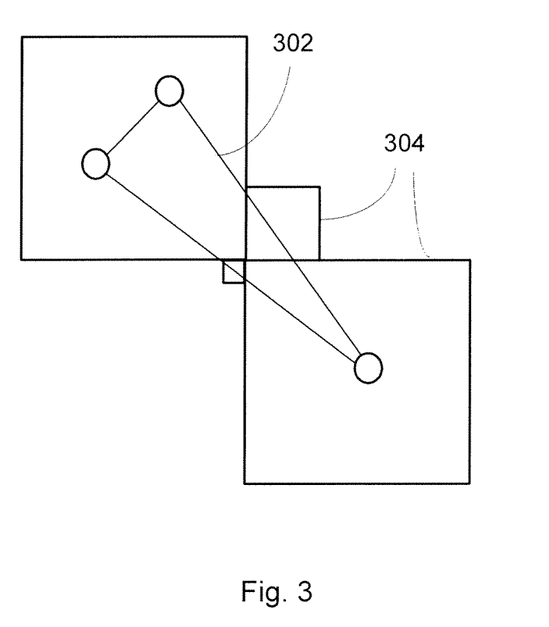
FIG. 3 is an illustration of a spatial representation.

FIG. 3 illustrates a technique for creating a spatial representation having variable sized regions for spatial representation.

Figure 4:
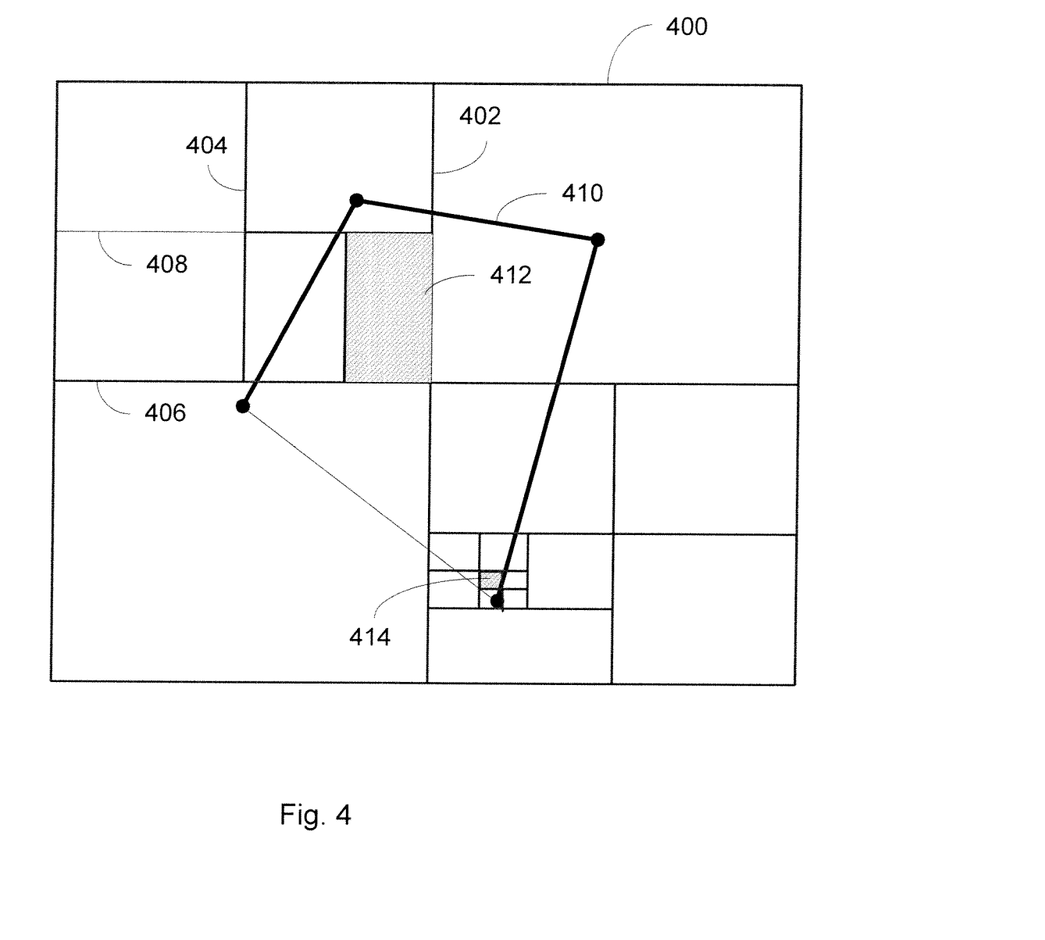
FIG. 4 is an illustration of limit conditions in a spatial representation.

FIG. 4 shows limit conditions for the spatial representation process. As a bounding box rectangle is divided into sub-regions by vertical dividers 402, 404 and horizontal dividers 406, 408, the resulting regions may be analyzed to see if they are completely contained by the polygon 410, such as region 412, or whether the region has reached a limit size, such as region 414. When the recursive process of sub-dividing and testing has been completed, the resulting regions may be enumerated to create a single vector for each region, as illustrated below in the description of FIGS. 6 and 7.

Figure 5:
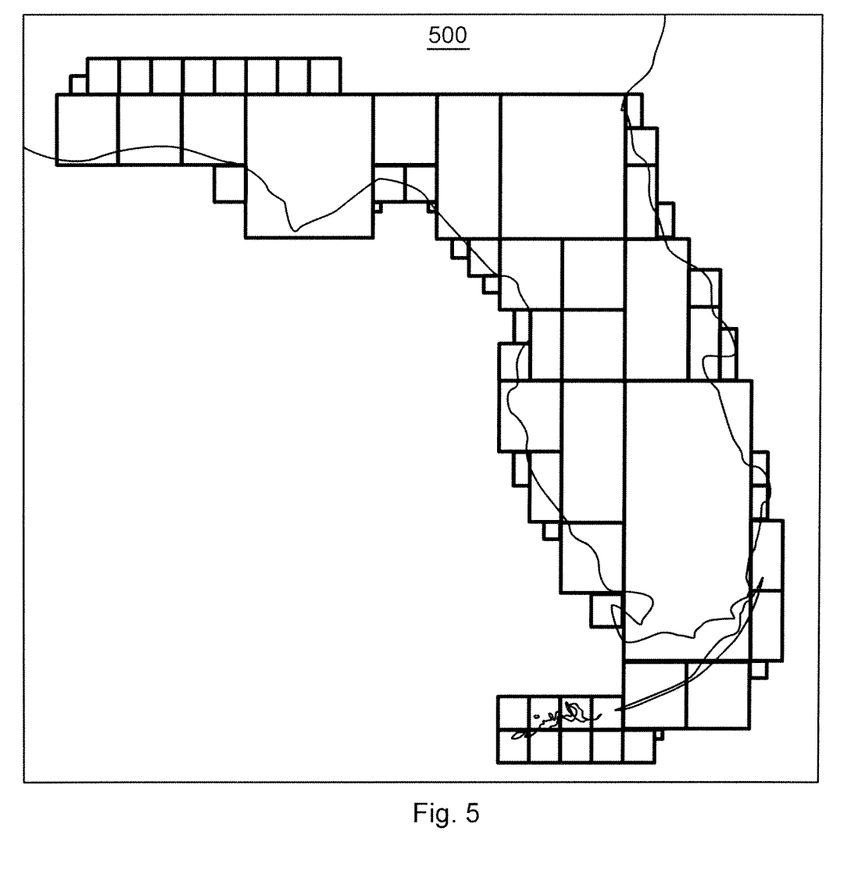
FIG. 5 illustrates application of a spatial representation to a geographic region.

FIG. 5 illustrates application of the technique described in FIG. 4 to a geographic region, i.e., the state of Florida. As can be seen, larger, bounded regions are generally found in the center and smaller border regions are generated near the edges.

Figure 6:
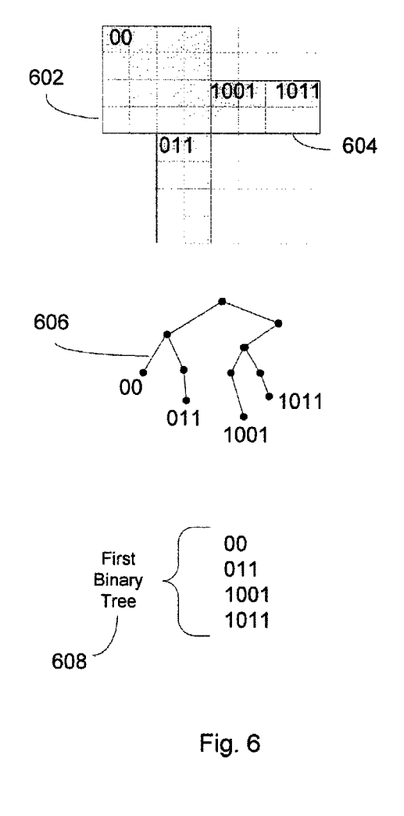
FIG. 6 illustrates a binary tree of a first spatial region.

FIG. 6 illustrates generation of a bounded spatial region 602. Everything to the left of a vertical centerline is assigned a large-endian bit value of 0, with regions to the right of the vertical centerline assigned a value of 1. Areas above a horizontal centerline are assigned a second bit value of 0, while regions below the horizontal centerline are assigned a value of 1. Each subdivision of a quadrant results in additional digits being added to the binary description.

To illustrate, sub-region 604 is the rightmost region in the figure and is to the right of the vertical centerline and above the horizontal centerline for an initial value of 10. With respect to the upper right quadrant, sub-region 604 is to the right of its vertical centerline and below its horizontal centerline, for an additional description of 11. Therefore, sub-region 604 may be described with the vector multi-key element 1011.

A standard binary tree representation of the region 602 is illustrated in binary tree 606. A zero value is represented by a right to left line and a one value is represented by a left to right line. An endpoint is called a leaf. An ordered set of descriptors, or one vector multi-key (VMK) is illustrated at 608 and is a collection of leaves in sequence from left to right in the binary tree representation 608.

Figure 7:
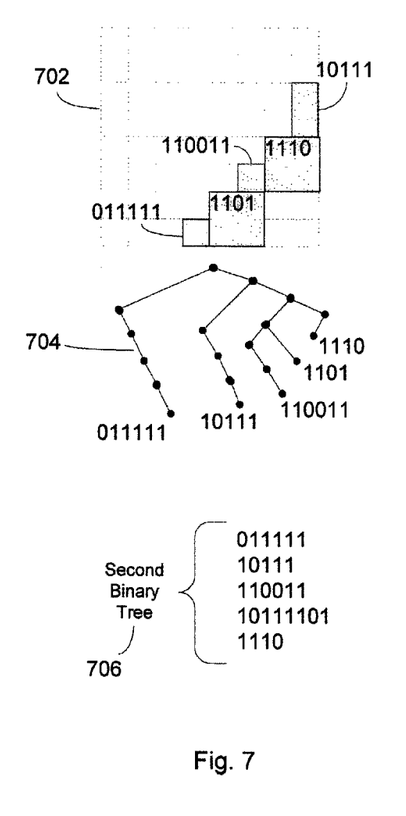
FIG. 7 illustrates a second binary tree of a second spatial region.

FIG. 7 illustrates another spatial region 702 and its associated binary tree 704. The ordered VMK is shown at 706. To perform an intersection of the region 602 of FIG. 6 and the region 702, one can imagine overlaying one on the other and determining which sub-regions are in common between both.

Figure 8:
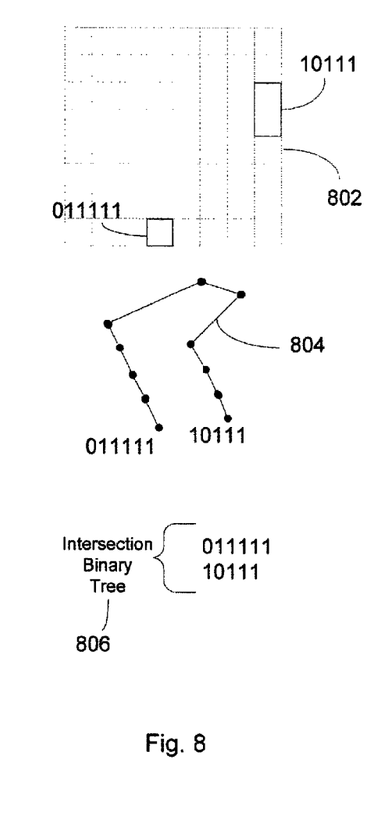
FIG. 8 illustrates an intersection of the binary trees of FIGS. 6 and 7.

FIG. 8 illustrates such an intersection 802 between the regions 602 and 702 of FIGS. 6 and 7, respectively. The binary tree for the intersection 802 is shown in diagram 804. As described below, with respect to FIGS. 9 and 10, the resulting set of descriptors 806 is also in an ordered sequence, from lowest to highest.

Figure 9:
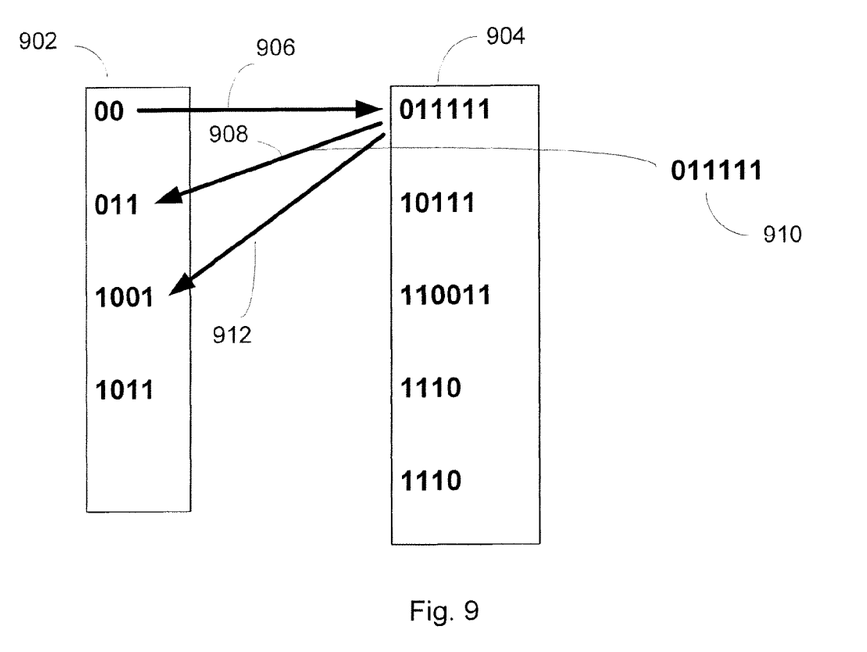
FIG. 9 shows an ordered search between the binary trees of FIGS. 6 and 7.

FIG. 9 illustrates the sequence of comparisons made to determine an intersection between two VMKs. Unlike a non-ordered sequence, where every combination of elements from two lists may need to be compared (n×m), the ordered comparison is an n+m operation. Two VMKs 902 and 904 are illustrated. A first comparison 906 is made and the determination is made that the first element of 904 (011111) is larger than the first element of 902. Under this condition, processing skips to the next list (in this case 904). A comparison 908 is made with the second element (011) of VMK 902. The second element of list 902 completely contains the first element of 904, so an intersection is found and the smaller overlapping region is stored as result 910.

The first element of VMK 904 is compared 912 to the third element of VMK 902. The third element of 902 is larger than the first element of VMK 904, so processing switches back to the other VMK in this case, 902, as is illustrated in FIG. 10.

Figure 10:
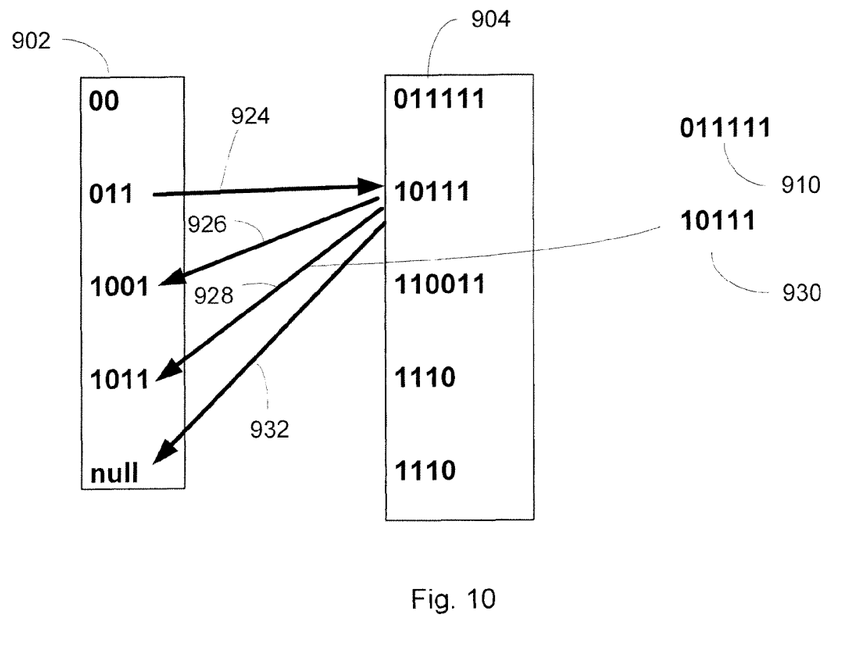
FIG. 10 shows a continuation of the ordered search of FIG. 9.

In FIG. 10, a comparison 924 is made between the second element of VMK 902 and the second element of VMK 904. The comparison 924 shows that the second element of VMK 904 is larger, so processing reverts back to VMK 904.

Another comparison 926 is performed and the third element of VMK 902 is smaller than the second element of 904. The second element of 904 is compared 928 to the fourth element of 902 and, again, the fourth element of 902 contains the second element of 904. The intersection result 930 is stored and the next comparison 932 determines that the end of VMK 902 has been reached. After determining that the third element of 904 is larger than the fourth element of 902, the search may be stopped.

The results, 910 and 930, are, themselves, ordered. If another intersection is to be performed, the results 910 and 930 are in condition for another search of the kind described above without further processing.

When applied to a geographic problem, this technique allows a rapid search for intersections between map data search terms. As described in the co-pending application referenced above, a search for map search terms, 210 Main St., Redbridge, London may be individually cataloged and a spatial overlap performed, first between each region named London and each region named Redbridge. The results of that search may be compared to geographic data corresponding to the 200 block of Main St. Because there may be multiple candidates for each individual term, the intersection process may be used to quickly eliminate candidates which don't meet all the criteria, such as London, Kentucky, and London, Connecticut, but retaining London, UK. When an overlap exists for only one or two possible candidates, the search may be narrowed to only those candidates with a high confidence that the intended targets are included in the final selections.

Figure 11:
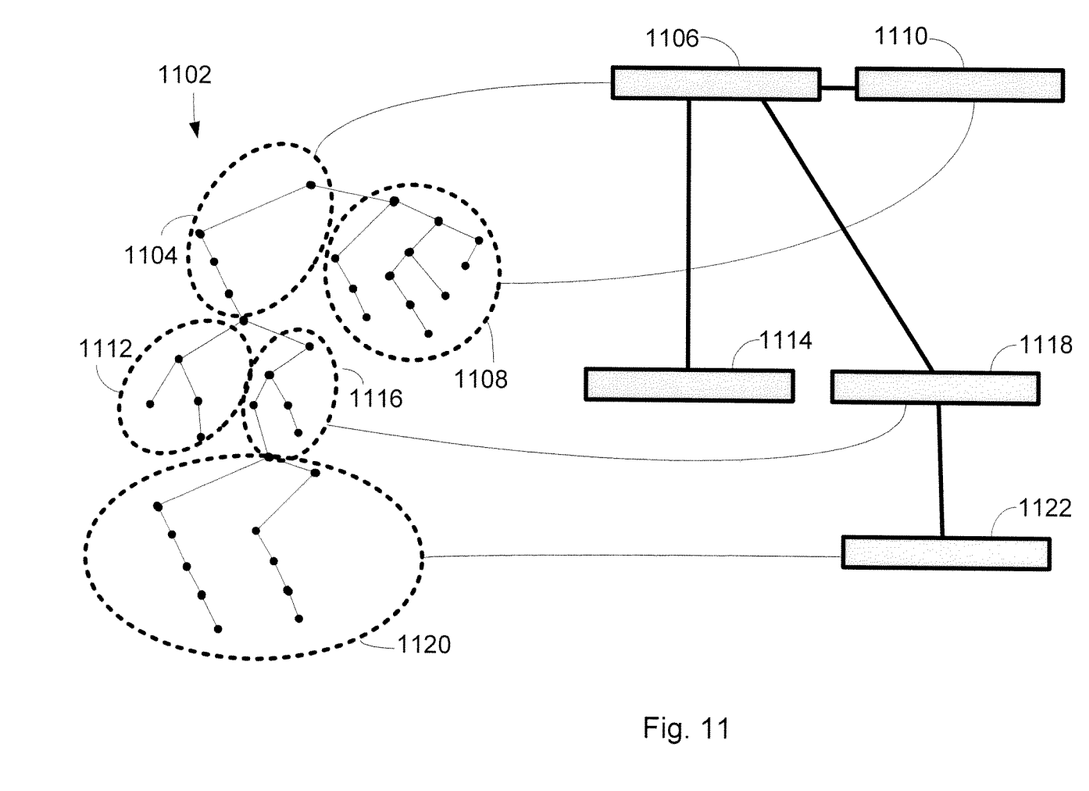
FIG. 11 illustrates hierarchical decomposition of a binary tree.

FIG. 11 illustrates hierarchical decomposition of large binary tree 1102. Top level elements 1104 and 1108 may be mapped to structures 1106 and 1110, respectively. Similarly, elements 1112 may be mapped to 1114, 1116 to 1118, and 1120 to 1122. When performing the search, or linear comparison, of FIGS. 9 and 10, only the top-most structures need to be searched unless a match occurs, at which point, recursion down the structures may be performed to complete the intersection process.

Figure 12:
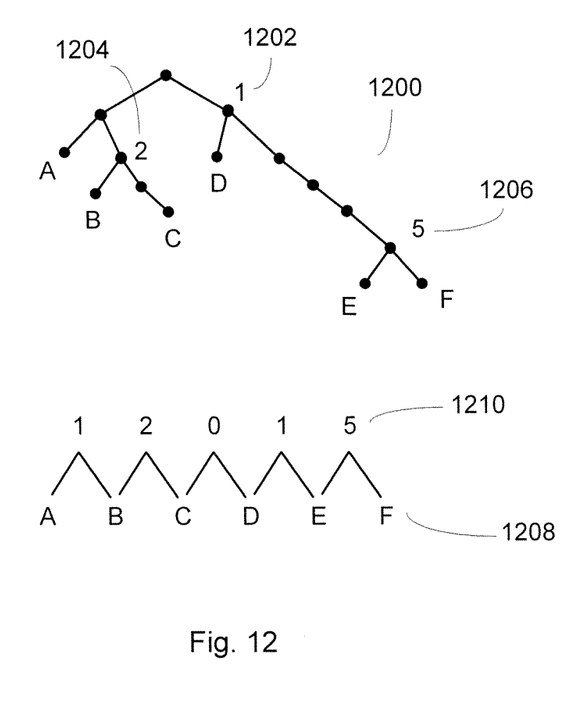
FIG. 12 illustrates compression of binary trees.

FIG. 12 illustrates binary tree compression, using an exemplary binary tree 1200, having endpoints A-F. The depth of the binary tree 1200, that is, the number of binary digits from the starting point, is indicated at several points by the number 1 1202, the number 2 1204, and the number 5 1206.

A common ancestor for two points is the deepest point in the array which both points share. For example, number 5 1206 is the common ancestor of points E and F. To begin the compression process, an array 1208, which contains the depth of the common ancestor for each neighbor in the VMK array is created. The resulting array can be sorted while keeping a reference to the left/right neighbor.

Processing may begin from the deepest common-ancestor. Two adjacent vectors (i.e. neighboring children) can be merged, keeping their index (depth). For each merge, visit neighbors to determine if they can be merged. A merge is allowed when the neighbor's length is the same as the merged vector, and the common-ancestor depth must be exactly one less than this length. This merge can bubble up several times, as illustrated by the merge of points E and F, with point D. For each merge, a counter of removed vectors may be incremented.

The merging process may continue in order of decreasing depth until the depth number exceeds needed level of compression. Finally, the new, compressed, array 1210 may be created by saving an original index and the unique keys that remain after the merging. This compression methodology presents one, lossy mechanism to compress or reduce the number of vectors use to represent a shape. Other, lossless techniques for compression may be used when storing VMKs in memory or on disk. For example, only the changes or deltas between successive vectors may be stored, and those may additionally be stored in a compact form by relying on a dictionary of common deltas, or buy using other generally available techniques for compressing data.

Figure 13:
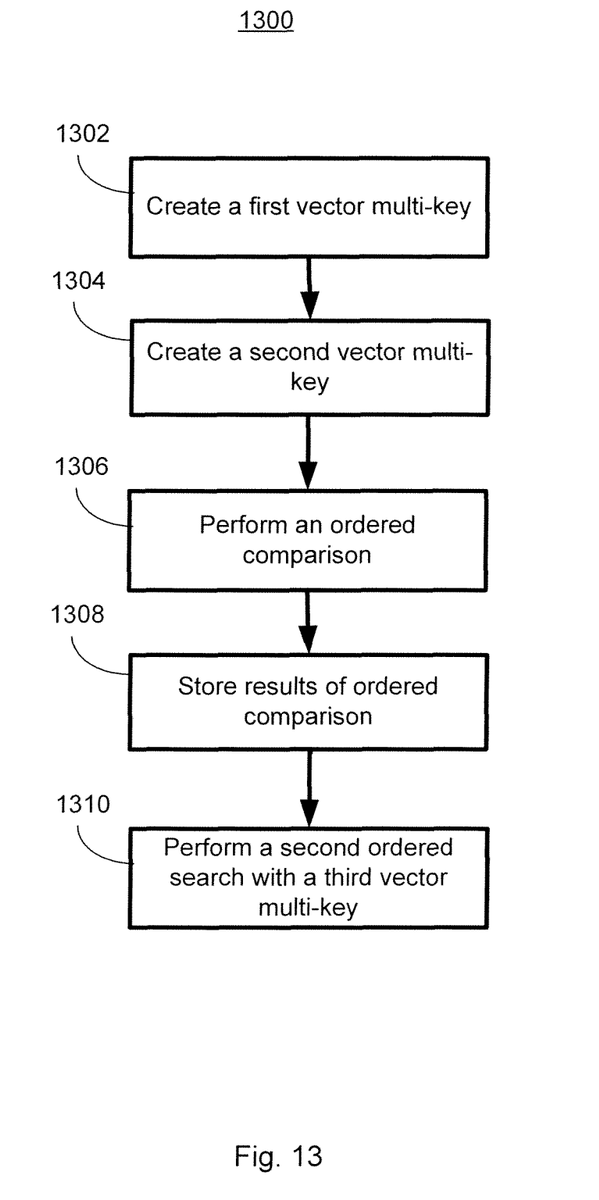
FIG. 13 is a method of performing generating and using an approximate spatial representation.

FIG. 13 illustrates a method 1300 of developing and using spatial representations. At block 1302, a first vector multi-key (VMK) may be created, relating to a spatial region, such as a geographic region. The VMK may be created by bounding the spatial region by an initial rectangle and then successively dividing the initial rectangle in smaller rectangles until a resulting rectangle is enclosed by the first spatial region or the resulting rectangle reaches a limit size, each resulting rectangle represented by a single binary entry in the first VMK, as described above with respect to FIGS. 5-8.

At block 1304, a second VMK may be created using the process described above with respect to block 1302. In one exemplary embodiment, a VMK may be created for each named spatial region, such as geographic areas. For example, all cities, counties, states, roads, attractions, and features in a country may be captured as separate VMKs.

At block 1306, an ordered comparison between two VMKs may be performed. As described above with respect to FIGS. 9-10, the ordered comparison may be performed by comparing binary list values of the first and second VMKs and alternating VMKs when a search value of one VMK passes a target value in the other VMK. The comparison may be performed in response to a request to filter a search for possibly ambiguous search terms. For example, a search for Redbridge, London, may trigger a spatial comparison for all geographic areas named Redbridge and all geographic areas named London.

At block 1308, results from the ordered comparison may be stored. At block 1310, a second ordered search may be performed between the results of the first comparison and another geographic term. In the example above, a street address may be included for the Redbridge, London search. The addition of the additional term may allow selection between London, UK and London, Connecticut.

The spatial comparison process outlined above represents a significant improvement over prior art methods of determining spatial overlaps and is particularly useful for fast geographic searches in mapping applications. Because geographic locations may be represented by a binary tree of absolute coordinates, a query related to a street and city may quickly eliminate from the query process those cities that do not have a corresponding street, using a fast geographic lookup, rather than an exhaustive text search. The application of binary tree representations to not only geographic regions but n-space mathematical models allows the comparison process to operate in a linear mode (n×m) rather than an exponential mode (n×m), making such as geographic search feasible.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

I claim:

1. A method of determining and extracting an overlap between spatial regions comprising:
    creating a first vector multi-key (VMK) representing a first spatial region;
    creating a first compressed VMK by compressing the first VMK wherein compressing the first VMK comprises:
        building a matrix of VMK entries representing binary vectors,
        checking adjacent entries of the matrix for a common ancestor where a common ancestor is the deepest point in the array which the two adjacent entries share, and
        merging two vectors when a neighboring entry vector is the same length as a chosen vector and a common ancestor depth is one less than a depth of the chosen vector;
    creating a second VMK representing a second spatial region;
    performing an ordered comparison of the first and second VMKs using a first binary tree for the first VMK and a second binary tree for the second VMK comprising:
        comparing binary list values of the first VMK derived from the first binary tree and the second VMK derived from the secondary binary tree; and
        alternating between the first and second VMKs when a search value of one of the first or the second VMK passes a target value in the other of the first or second VMK; and
    storing overlapping terms from the ordered comparison, the overlapping terms representing a spatial overlap region between the first and second spatial regions.

2. The method of claim 1, further comprising:
    performing another ordered comparison between a third VMK and the overlapping terms from the ordered comparison of the first and second spatial regions.

3. The method of claim 1, wherein creating the first VMK comprises:
    bounding the first spatial region by an initial rectangle;
    successively dividing the initial rectangle in smaller rectangles until a resulting rectangle is enclosed by the first spatial region or the resulting rectangle reaches a limit size, each resulting rectangle represented by a single binary entry in the first VMK.

4. The method of claim 3, further comprising:
    compressing each entry in the first VMK.

5. The method of claim 1, wherein the first and second spatial regions are geographic regions.

6. The method of claim 1, wherein the first and second spatial regions are n-dimensional spaces.

7. The method of claim 1, further comprising:
    compressing the second VMK.

8. The method of claim 7, wherein compressing the second VMK comprises:
building a matrix of VMK entries representing binary vectors;
checking adjacent entries of the matrix for a common ancestor where a common ancestor is the deepest point in the array which the two adjacent entries share; and
merging two vectors when a neighboring vector is the same length as a chosen vector and a common ancestor depth is one less than a depth of the chosen vector.

9. A computer-readable storage device having computer-executable instructions stored therein comprising:
a first module for creating a vector multi-key (VMK) representing a spatial region, wherein the VMK is a series of binary vectors that describe some approximation of a spatial representation using a bounding box;
a second module for performing an ordered comparison between two VMKs using a linear binary tree structure for each of the two VMKs to create a result VMK; and
a third module that stores the result VMK; and
a fourth module for compressing the result VMK wherein compressing the result VMK comprises:
building a matrix of VMK entries representing binary vectors;
checking adjacent entries of the matrix for a common ancestor where a common ancestor is the deepest point in the array which the two adjacent entries share; and
merging two vectors when a neighboring vector is the same length as a chosen vector and a common ancestor depth is one less than a depth of the chosen vector.

10. The computer-readable storage device of the claim 9, further comprising:
a fifth module that reads the result VMK and presents the result VMK and another VMK to the second module for performing a comparison between the result VMK and the another VMK.

11. The computer-readable storage device of claim 9, wherein the first module creates the VMK by executing an additional module that bounds the spatial region by an initial rectangle, and successively divides the initial rectangle in smaller rectangles until a resulting rectangle is enclosed by the spatial region or the resulting rectangle reaches a limit size, wherein each resulting rectangle represented by a single binary entry in the first VMK.

12. The computer-readable storage device of claim 9, wherein the second module performs the ordered comparison by first comparing binary vectors from one VMK with binary vectors from an other VMK, and then by alternating between binary vectors for search references when a current search vector in one VMK value exceeds a current target vector in the other VMK.

13. The computer-readable storage device of claim 9, wherein the spatial region is a geographic region.

14. The computer-readable storage device of claim 13, wherein the spatial region is an n-dimensional space.

15. A method of performing an search for overlapping terms in a vector space representing a spatial region comprising:
creating a first vector multi-key (VMK) of a first geographic region by:
bounding the first geographic region by an initial rectangle;
successively dividing the initial rectangle in smaller rectangles until a resulting rectangle is enclosed by the first geographic region or the resulting rectangle reaches a limit size, each resulting rectangle represented by a single binary entry in the first VMK; and
storing the first VMK;
creating a first compressed VMK by compressing the first VMK wherein compressing the first VMK comprises:
building a matrix of VMK entries representing binary vectors,
checking adjacent entries of the matrix for a common ancestor where a common ancestor is the deepest point in the array which the two adjacent entries share, and
merging two vectors when a neighboring entry vector is the same length as a chosen vector and a common ancestor depth is one less than a depth of the chosen vector;
creating a second VMK representing a second geographic region by:
bounding the second geographic region by a second initial rectangle;
successively dividing the second initial rectangle in smaller rectangles until a resulting second rectangle is enclosed by the second geographic region or the resulting second rectangle reaches the limit size, each resulting second rectangle represented by a second single binary entry in the second VMK; and
storing the second VMK;
performing an ordered comparison of the first and second VMKs by:
comparing binary list values of the first and second VMKs; and
alternating search lists when a search value in one of the first and second VMK exceeds a term in the other of the first and second VMK;
storing a result VMK of overlapping terms from the ordered comparison, the overlapping terms representing a geographic overlap region between the first and second geographic regions.

16. The method of claim 15, further comprising:
performing another ordered comparison between a third VMK and the result VMK.

17. The method of claim 15, further comprising:
representing at least one of the first and second VMKs in a hierarchical fashion prior to performing the ordered comparison.

18. The method of claim 15, further comprising:
representing at least one of the first and second VMKs in a hierarchical fashion; and
compressing the at least one of the first and second VMKs represented in a hierarchical fashion.

\* \* \* \* \*